Patented Nov. 8, 1949

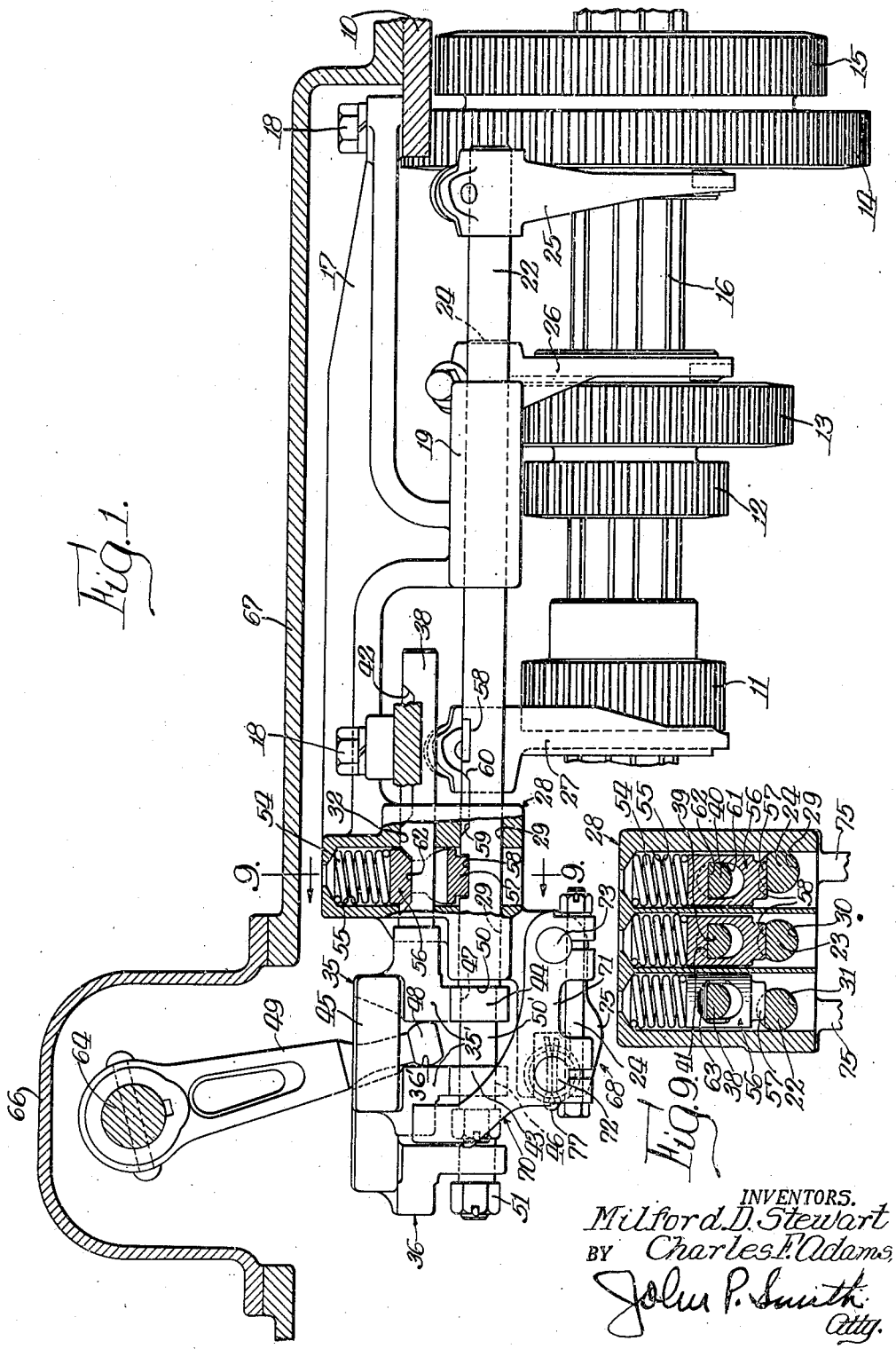

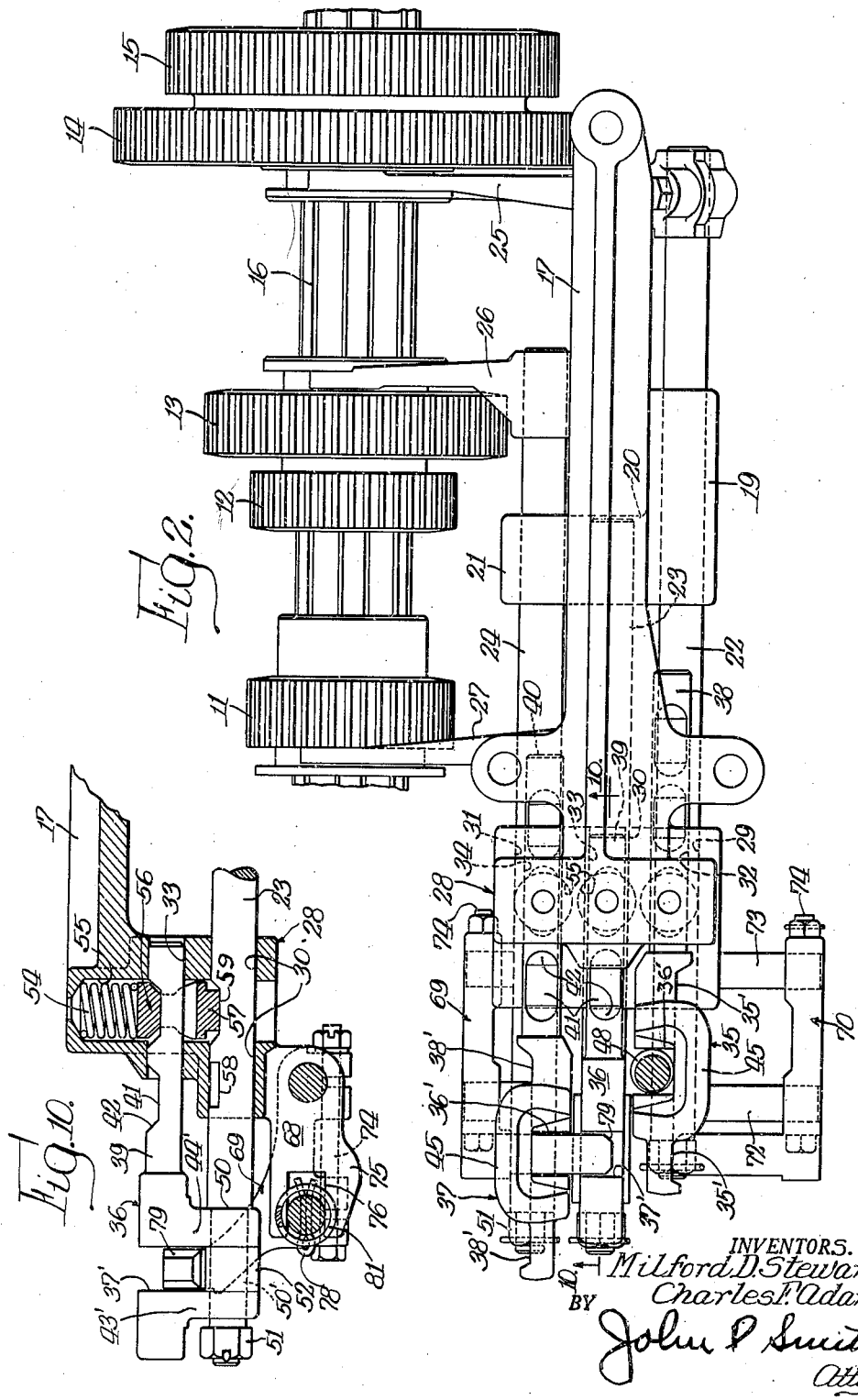

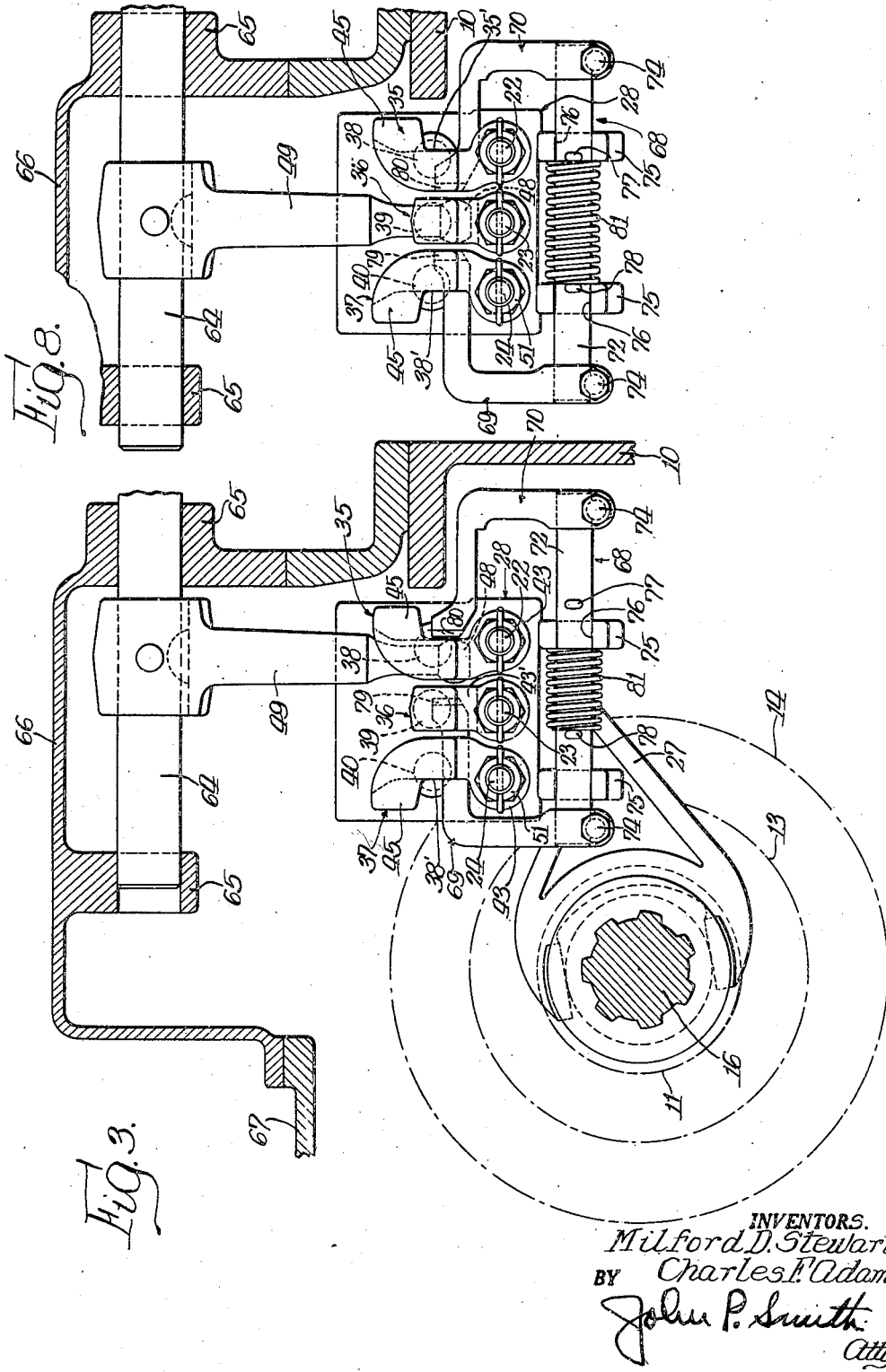

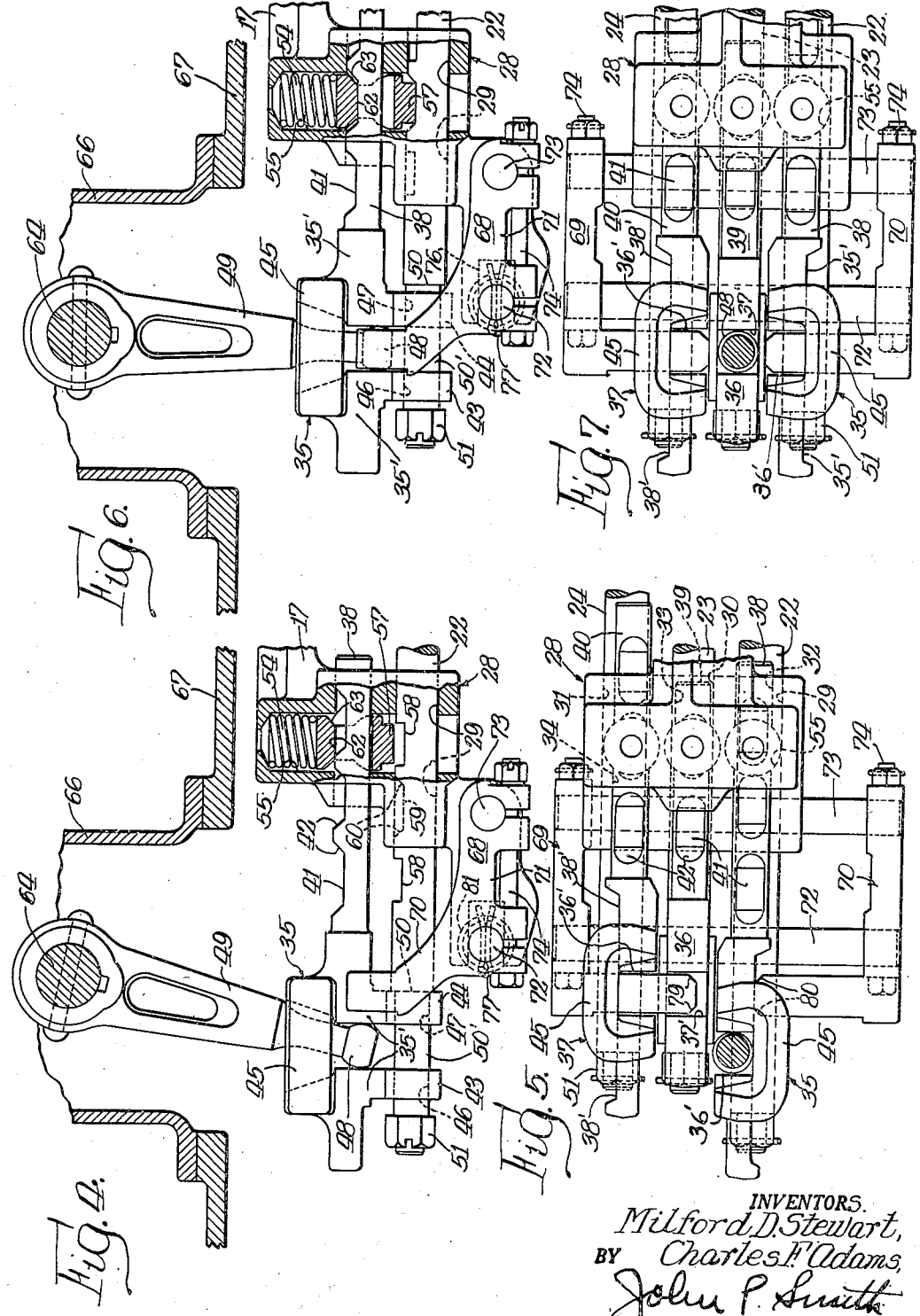

2,487,283

UNITED STATES PATENT OFFICE 2,487,283

TRANSMISSION GEARSHIFT LOCK

Milford D. Stewart, South Bend, Ind., and Charles F. Adams, Charles City, Iowa, assignors to The Oliver Corporation, a corporation of Delaware Application April 6, 1946, Serial No. 660,166

15 Claims. (Cl. 74—477)

1

The present invention relates generally to a transmission gear shift lock, but more particularly to a novel, efficient and easily operated gear shift mechanism and a lock therefor which will positively secure gears from accidental displacement after once being shifted.

Considerable difficulty has been encountered with transmission mechanisms heretofore constructed, especially in connection with tractors and automotive-operated machinery of various types, in overcoming the tendency of the transmission gears to creep from their normal operative engagement. Under many circumstances, such for example, an abrupt stopping of the tractor or other motor-operated machinery, when the same strikes an obstruction, the sudden impact causes certain gears, not being used at the time, to be shifted into accidental meshing relationship with certain other gears, resulting in locking of the whole transmission mechanism or breakage of the gears. Various attempts have been made to overcome this difficulty by employing heavier springs to operate the tappet lock for the shifter rod, but each attempt has not only failed to overcome the difficulty, but has also increased the burden on the operator in shifting the gears.

It is, therefore, one of the primary objects of the present invention to not only overcome the difficulty hereinbefore pointed out, but to also provide a novel and improved transmission gear shifting mechanism which will shift the gears with little or no effort and at the same time positively lock the gears in their shifted or meshing position and will prevent the accidental displacement thereof.

A further object of the invention is to provide a novel and improved construction of transmission gear shifting mechanism and lock therefor in which a rectangular or square lock member is adapted to engage complementary recesses in the shifter rod to positively lock and prevent accidental displacement or disengagement of the meshing gears.

A still further object of the invention is to provide a novel and improved transmission gear shift locking mechanism which requires a relatively light pressure spring to lock the tappet member in the recess in the shifter rod, therefore requiring less effort on the part of the operator in manipulating the gear shift lever.

A still further object of the invention is to provide a novel and improved gear shifting mechanism in which the gear shift lever is automatically returned to central position by neutral

2 centering spring, giving the tractor operator the advantage of knowing the position of the lever when the lever is shifted from neutral position.

These and other objects are accomplished by providing a construction and an arrangement of the various parts in the manner hereinafter described and particularly pointed out in the appended claims.

Referring to the drawings:

Fig. 1 is a fragmentary side elevational view partly in cross section of a transmission mechanism showing our improved gear shifting and locking mechanism embodied therein;

Fig. 2 is a top plan of the mechanism shown in Fig. 1 with the cover and part of the shifting mechanism shown in cross section;

Fig. 3 is an end elevational view of the mechanism shown in Fig. 1;

Fig. 4 is a side elevational view partly in cross section showing the position of the various parts when one of the locks is raised or unlocked from the shifter rod;

Fig. 5 is a top plan view showing the operating parts in Fig. 4;

Fig. 6 is a fragmentary side elevational view, partly in cross section, showing the locking member and shifter lever in neutral position;

Fig. 7 is a fragmentary top plan view showing the relative position of the operative parts in Fig. 6;

Fig. 8 is a fragmentary end elevational view showing the shifter lever in neutral position and the other operative parts as shown in Fig. 6 of the drawings;

Fig. 9 is a cross sectional view taken on the line 9—9 in Fig. 1; and

Fig. 10 is a cross sectional view taken on the line 10—10 in Fig. 2.

In illustrating one form our invention may assume in practice, we have shown the same in connection with a more or less conventional form of automotive transmission comprising briefly, a main frame or housing, only a fragmentary portion of which is shown in the drawings, designated by the reference character 10. Mounted within the housing in a manner well understood in the art, are a plurality of transmission gears 11, 12, 13, 14 and 15, which are slidably mounted on a splined shaft 16. These transmission gears are adapted to be shifted longitudinally of the shaft into meshing relation with other gears of the transmission mechanism (not shown) in a manner well understood in the art. Our improved gear shift and transmission locking mechanism is supported and removable as a whole by a longitudinally extending frame member or casting 17 which is secured to the main frame or housing 10 by three bolts 18. Formed integrally with the frame member 17 at a point intermediate its ends are laterally spaced horizontally extending shifter rod sleeves 19, 20 and 21 in which the forward portions of each of the shifter rods 22, 23 and 24 are slidably mounted. Secured to the shifter rods 22, 23 and 24 are shifter forks 25, 26 and 27 respectively which are adapted to engage the transmission gears in the manner well understood in the art. Formed integrally with the rear end of the casting 17 is a rectangular prism-like block generally indicated by the reference character 28. In longitudinal alignment with the sleeves 19, 20 and 21 are the respective longitudinal bores 29, 30 and 31 in the block 28 which form the rearward support for the respective shifter rods 22, 23 and 24. Mounted in longitudinally extending and laterally spaced bores 32, 33 and 34 in the block 28 and vertically above the respective shifter rods 23 and 24 are shifter heads generally indicated by the reference characters 35, 36 and 37. Each of the shifter heads 35, 36 and 37 have a forwardly and longitudinally extending shaft portion 38, 39 and 40 located vertically above each of the respective shifter rods 22, 23 and 24. Each of these shaft portions have uniformally spaced apart recesses 41 in the top periphery thereof with the ends of the recesses terminating in beveled or inclined portions shown at 42 at substantially an angle of forty-five degrees for the purpose hereinafter set forth. Each of the two outside shifter heads 35 and 37 are identical except one is the reverse of the other and both have two longitudinally spaced apart depending arms 43 and 44. These depending arms of the outside shifter heads 35 and 37 are connected together by arcuate portions 45 to form in effect substantially oppositely disposed U-shaped formations as viewed from Fig. 2 of the drawings. The lower ends of these arms 43 and 44 have longitudinally aligned apertures 46 and 47 respectively, to slidably receive the respective shifter rods 22 and 24. The arms 43 and 44 of the respective heads 35 and 37 are sufficiently spaced apart so as to form recesses or passageways 36' to freely permit the passage of a ball-like end 48 of the lower end of a shifter lever 49 and the free passage of locking fingers hereinafter described. Each of the shifter heads 35, 36 and 37 are limited in their relative movement with respect to their respective shifter rods 22, 23 and 24 by a shoulder 50 formed adjacent the reduced ends 50' of the respective shifter rods and by a nut 51 mounted in threaded engagement with the rear ends of each of the respective shifter rods. The center shifter rod head 36, as shown in Fig. 10 of the drawings, is slightly different than the other shifter rod heads in that the arms 43' and 44' are formed integrally with a sleeve-like portion 52 through which the reduced portion 50' of the center shifter rod 23 extends. The arms 43' and 44' are spaced apart so as to form a recess or passageway 37' to permit the free passage of the lever 49 and the locking fingers hereinafter described. The shifter rod head 36 has a free limited sliding movement on the reduced portion 50' of the shifter rod 23 between the shoulder 50 and the inner end of the nut 51 mounted on the rear end of the shifter rod 23 so that when all the shifter rod heads are in the neutral position as shown in Fig. 7 of the drawings, the ball-like portion 48 of the shifter lever 49 is free to move laterally in the passageways 36' and 37' between the respective arms 43 and 44, 43' and 44' of the respective shifter heads 35, 37 and 36, as clearly shown in this figure.

One of the important features of the present invention involves a novel positive lock or poppet which is spring actuated and has a locking portion of square cross section so as to engage the complementary square recess within each of the respective shifter rods to insure positive locking. The construction also reduces to a minimum the effort required to operate the lever for unlocking the positive lock during the shifting operation to various speeds or to neutral position. This novel means includes a series of three compression springs 54 mounted in vertically positioned cylindrical sockets 55 formed in the rear end of the casting or frame member 17. These sockets are located in vertical alignment above each of the respective shifter rods 22, 23 and 24 and the shifter head shafts 38, 39 and 40. Reciprocally mounted in each of the sockets 55 and normally pressed downwardly by each of the springs 54 are complementary fitting poppet or locking members, generally indicated by the reference character 56. (See Fig. 9 of the drawings.) The lower ends of each of these poppet or locking members 56 have a square positive locking portion 57 which is adapted to positively lock in complementary, rectangular recesses 58 in each of the respective shifter rods 22, 23 and 24. The two outside shifter rods 22 and 24 have two spaced apart abrupt or square recesses 58 on their upper periphery thereof with a neutral recess 59 spaced between. The neutral recesses in each of these rods 22 and 24 have their forward and rearward ends beveled at substantially a forty-five degree angle as shown at 60. Each of the locking members has a longitudinally extending opening 61 therein with the lower portion thereof semi-circular and the upper portion flat as shown at 62. The forward and rearward portions of the flat surface 62 of the poppets 56 terminate in upwardly inclined bevels 63 which are arranged substantially at forty-five degrees with a flat portion 62 so that each locking member 56 will readily ride up the inclined portions 42 of the recesses 41 of each of the shifter head shafts 38, 39 and 40 to compress the spring 54 in the operation of unlocking the square portions 57 of each of the locking members from the square recesses 58 of each of the shifter rods 22, 23 and 24. The upper ends of the shifter lever 49 is secured to a shaft 64, which is oscillatably and laterally slidable in two spaced apart bearing portions 65 formed in a removable cap 66. The cap 66 is removably secured to a removable housing cover 67. Extending upwardly from the outside portion of the shaft is an operator's shifter lever (not shown).

Another important feature of the invention is a novel means for automatically returning the shifter lever to central or neutral position when any one of the rods is shifted by the lever to its normal neutral position, in combination with means for locking the two other shifter rods when the third shifter rod is being shifted to engage certain of the gears of the transmission mechanism. This mechanism includes a laterally movable or shiftable frame structure, generally indicated by the reference character 68 and comprises two oppositely disposed inverted L-shaped locking fingers 69 and 70 as viewed in Fig. 3 of the drawings. These fingers 69 and 70 have longitudinally extending portions 71 which are carried by and secured to two transversely and longitudinally spaced apart shafts 72 and 73 by clamping bolts 74. These shafts 72 and 73 are slidably mounted in depending and rearwardly extending laterally spaced apart ears 75 formed integrally with the block 28 and the casting 17. The shaft 73 is slidably mounted in round apertures in the spaced apart depending ears 75, but the shaft 72 is mounted in rectangular apertures 76 which are opened at their rear ends. The longitudinal length of these apertures 76 is such that free passage therethrough of spaced apart cotters 77 and 78 is permitted for the purpose hereinafter set forth. The horizontal and inwardly projecting portion of these inverted L-shaped locking fingers 69 and 70 are positioned in spaced apart relation as shown at 79 and 80 respectively so as to provide sufficient space or clearance for the ball-like end 48 of the shifter lever 49. The inner ends 79 and 80 respectively of the locking fingers 69 and 70 are adapted to move transversely in the path or recesses 36' and 37' between the arms 43, 44, 43' and 44' of the respective shifter rod heads 35, 37 and 36 for locking two of the shifter rods during the time the third rod is being shifted. The shift lever 49 is normally returned to central or neutral position, or the position shown in Fig. 8 of the drawings, by a compression or centering spring 81 mounted on and surrounding the shaft 72. In central position, or the position shown in Fig. 8 of the drawings, the opposite ends of the spring simultaneously engage the opposite cotter pins 77 and 78 and the inner faces of the oppositely disposed depending ears 75 adjacent the rectangular slots 76. From the above it will be observed that when the shift lever 49 is shifted laterally from the position shown in Fig. 8 to the position shown in Fig. 3, the ball-like end 48 of the lever will engage the inner end 80 of the locking finger 70 to shift the frame 68 and thereby compress the spring 81 between the cotter pins 78 and the inner face of the right hand ear 75 as viewed in Fig. 3 of the drawings. In this connection it will be observed that the rectangular slot 76 in the ear 75 of this figure permits the cotter 77 to pass freely therethrough or permits the cotter 78 to pass through the opposite ear 75 should the shift lever 49 be shifted in the other direction. In the position shown in Fig. 3 of the drawings, it will be noted that the locking finger 79 is moved into the recesses or passageways 36' and 37' of the respective shifter heads 37 and 36 so as to lock the respective shifter rods 24 and 23 against displacement while the shifting lever is operating or manipulating the shifter rod 22. In this connection it will also be noted that each of the outside shifter heads 35 and 37 have forward and rearward flat extensions 35' and 38' which are adapted to engage respectively the inner ends 80 and 79 of the locking fingers 70 and 69 to hold the fingers in proper locking position when either one of the outside shifter rods 22 or 24 are being shifted by the lever 49.

Summarizing the advantages and the functions of operation of our transmission gear shift and locking mechanism, let us assume that the gear shifting and locking mechanism is in neutral position as shown in Figs. 6, 7 and 8 of the drawings. In this neutral position, the shifter lever 49 is in central position and the square locking lower ends 57 of each of the poppets or locking members 56 engage the beveled recesses 59 of each of the shifter rods 22, 23 and 24. If the operator desires to shift the transmission mechanism or gears from the neutral position shown in Figs. 6, 7 and 8 of the drawings, to third speed, for example, as shown in Figs. 1, 2 and 3 of the drawings, the ball end 48 of the lever 49 is first moved laterally into the passageway or recess 36' between the arms 43 and 44 of the shifter head 35. In so doing the ball-like end 48 of the lever 49 engages the inner end 80 of the locking finger 70 to urge the centering frame 68 to the right hand side as shown in Fig. 3 to compress the centering spring 81 as shown in this figure. In this position the finger 79 locks the shifter rods 23 and 24. As the lever 49 is then shifted forwardly, the initial portion of the movement of the lever 49 moves the shifter head 35 relatively to the shifter rod 22, in so doing the square portion 63 of the locking member 56 will readily ride up the beveled recesses respectively of the shifting rod 22 and shifter head shaft 36 until the square locking portion 57 of the poppet lock 56 engages the square or rectangular recess 58 of the shifter rod 22 to positively lock the transmission in third speed as shown in Figs. 1, 2 and 3 of the drawings. At the same time it will be noted that the inner end 79 of the locking finger 69 moves inwardly in the recesses 36' and 37' between the arms 43 and 44, 43' and 44' of the respective shifter rods 24 and 23 to lock them against movement and thereby prevent their accidental displacement or engagement of their respective gears by a sudden impact or otherwise which usually occurs in connection with a tractor or other automotive machinery, especially of the heavy type. In this connection it will be observed that the inner end 80 of the locking finger 70 rides on the rearwardly projecting surface 35' as shown in Fig. 1 of the drawings, to hold the centering frame 68 to the right hand side as shown in Fig. 3 until the lever returns to neutral position. In order to unlock the positive lock, or square portion 57 of any one of the poppets or locking members 56 from the rectangular or substantially square recesses 58 of any one of the shifter rods 22, 23 and 24, we have illustrated in Figs. 4 and 5 of the drawings the position these parts assume just at the time the poppet lock is being unlocked from fourth speed. As hereinbefore pointed out, each of the shifter heads 35, 36 and 37 have a slight relative movement with respect to their cooperating shifter rods 22, 23 and 24. For example, by examining Fig. 4 of the drawings, the shifter head 35 and arms 43 and 44 thereof is moved relative to the shifter rod 22 and such relative movement is limited by the space between the shoulder 50 formed by the reduced portion 50' of the rod 22, and the inner end of the nut 51. This relative movement permits the rear beveled portion 63 of the poppet lock 56 to ride up the beveled portion 42 of the bevelled recess 41 and thereby raise the square locking portion 57 of the poppet 56 to become disengaged from the locking recess 58 of the shifter rod 22 prior to the time the rod is shifted by further movement of the lever 49. All the shifter rods 22, 23 and 24, together with their respective shifter heads 35, 36 and 37, are similarly shifted, locked and unlocked by the simple and easy manipulation of the gear shift lever.

From the above description it will be seen that we have provided a very simple, efficient and positive locking gear shifting mechanism which will not only prevent accidental disengagement of the gears from their locked or shifted position, but will also prevent other gears not being used at the time, from becoming accidentally engaged or meshed when the tractor or other automotive equipment strikes an obstruction. In this connection it will also be noted that with the employment of a positive lock member with a sharp or square cross section, relatively lighter springs to actuate the lock member may be employed than heretofore required, thereby reducing the burden on the person operating the shifting mechanism.

While in the above specification we have described one embodiment which our invention may assume in practice, it will, of course, be understood that the same is capable of modification and that modification may be made without departing from the spirit and scope of the invention as expressed in the following claims.

What we claim as our invention and desire to secure by Letters Patent is:

1. A transmission gear shift locking mechanism comprising a frame, a gear shifter rod mounted in said frame having a positive locking recess therein, a locking member carried by said frame and engageable with said recess, a gear shift lever, and relatively longitudinally movable means extending through said locking member and operatively connected to said lever, locking member and said rod for unlocking said locking member from the recess in said rod.

2. A transmission gear shift locking mechanism comprising a frame, a gear shifter rod mounted in said frame having substantially a square recess therein, a locking member mounted in said frame having substantially a square locking portion complementary to and engageable with said recess, a spring for normally urging said member into locking engagement with said rod, a gear shift lever and a shifter head operatively connected to said lever, and slidable on said rod, said shifter head having a portion thereof extending through an aperture in said locking member for actuating said locking member.

3. A transmission gear shift locking mechanism comprising a frame, a longitudinally extending gear shifter rod slidably mounted in said frame having a plurality of locking recesses, a spring actuated locking poppet mounted in said frame and engageable with said recesses, said poppet having a longitudinal bore therein, a shifter head slidably mounted on said shifter rod, a shaft-like extension carried by said head and extending through the bore in said poppet, there being bevelled recesses in said shaft corresponding to the recesses in said rod, said bevelled recesses being so arranged to engage corresponding bevelled surfaces adjacent the bore in said poppet, and a gear shifter lever operatively connected to said head for actuating said poppet and subsequently shifting said rod.

4. A transmission gear shift locking mechanism comprising a frame, a plurality of longitudinally shiftable gear shift rods mounted in said frame, said rods having abrupted locking recesses therein, locking members carried by said frame having locking portions complementary to and engageable with the recesses in the respective rods, a gear shift lever, separate longitudinally movable shifter heads adapted to be selectively engaged by said lever and operatively related to said rods, each of said shifter heads being relatively movable with respect to said shifter rods and extending through said locking members whereby each of the respective locking members is actuated prior to shifting its cooperating shifter rod.

5. A transmission gear shift locking mechanism comprising a frame, a plurality of longitudinally shiftable gear shift rods mounted in said frame, said rods having abrupted locking recesses therein, locking members carried by said frame having locking portions complementary to and engageable with the recesses in the respective rods, a gear shift lever, and supplemental means mounted on said frame for positively locking certain of said shifter rods against accidental displacement.

6. A transmission gear shift locking mechanism comprising a frame, a plurality of longitudinally shiftable gear shift rods mounted in said frame, said rods having abrupted locking recesses therein, locking members carried by said frame having locking portions complementary to and engageable with the recesses in the respective rods, a gear shift lever, separate means operatively related to said lever and the respective locking members and their complementary rods for selectively actuating said locking members prior to shifting the respective shifter rods, and means mounted on said frame for normally centering said lever and locking certain of said shifter rods against accidental displacement.

7. A transmission gear shift locking mechanism comprising a frame, a plurality of longitudinally shiftable gear shift rods mounted in said frame, said rods having abrupted locking recesses therein, locking members carried by said frame, having locking portions complementary to and engageable with the recesses in the respective rods, a gear shift lever, separate means operatively related to said lever and the respective locking members and their complementary rods for selectively actuating said locking members prior to shifting the respective shifter rods, and a laterally shiftable frame adapted to be actuated by said lever for normally centering said lever and locking certain of said shifter heads and their respective shifter rods against accidental displacement.

8. A transmission gear shift locking mechanism comprising a frame, a plurality of laterally spaced longitudinally shiftable gear shift rods mounted in said frame having abrupted locking recesses therein, complementary shifter heads operatively related to each of said rods, there being bevelled recesses in said heads and normally located in substantially vertical alignment with the recesses in the respective shifter rods, a shifter lever carried by said frame for selectively engaging said shifter heads, a locking member complementary to and embracing each of said shifter heads and rods and having locking portions complementary to the recesses in said heads and rods, and separate springs mounted in said frame and engageable with each of said locking members for normally pressing said member into said recesses.

9. A transmission gear shift locking mechanism comprising a frame, a plurality of laterally spaced longitudinally shiftable gear shift rods mounted in said frame having abrupted locking recesses therein, complementary shifter heads operatively related to each of said rods, there being bevelled recesses in said heads and normally located in substantially vertical alignment with the recesses in the respective shifter rods, a shifter lever carried by said frame for selectively engaging said shifter heads, a locking member complementary to each of said shifter heads and rods and having locking portions complementary to the recesses in said heads and rods, separate springs mounted in said frame and engageable with each of said locking members for normally pressing said member into said recesses, and spring actuated means mounted on said frame and engageable with said shifter lever for tain of said shifter rods against accidental displacement.

10. A transmission gear shift locking mechanism comprising a frame, a plurality of laterally spaced longitudinally shiftable gear shift rods mounted in said frame having abrupted locking recesses therein, complementary shifter heads operatively related to each of said rods, there being bevelled recesses in said heads and normally located in substantially vertical alignment with the recesses in the respective shifter rods, a shifter lever carried by said frame for selectively engaging said shifter heads, a locking member complementary to each of said shifter heads and rods and having locking portions complementary to the recesses in said heads and rods, separate springs mounted in said frame and engageable with each of said locking members for normally pressing said member into said recesses, and spring actuated means mounted on said frame and engageable with said shifter lever for normally centering said lever and locking certain of said shifter rods against accidental displacement.

11. A transmission gear shift locking mechanism comprising a frame, a plurality of laterally spaced longitudinally shiftable gear shift rods mounted in said frame having abrupted locking recesses therein, complementary shifter heads operatively related to each of said rods, there being bevelled recesses in said heads and normally located in substantially vertical alignment with the recesses in the respective shifter rods, a shifter lever carried by said frame for selectively engaging said shifter heads, a locking member complementary to each of said shifter heads and rods and having locking portions complementary to the recesses in said heads and rods, separate springs mounted in said frame and engageable with each of said locking members for normally pressing said member into said recesses, and a laterally movable spring actuated centering frame slidably mounted adjacent the rear ends of said rods, said centering frame including two inwardly extending fingers positioned in the path of said lever for normally centering said lever and locking certain of said rods against accidental displacement.

12. A transmission gear shift locking mechanism comprising a frame, a plurality of laterally spaced and longitudinally movable shifter rods mounted in said frame, longitudinally movable shifter heads having forwardly extending shaft portions positioned parallel to and substantially vertically above each of the respective rods, each of said shifter heads operatively related to and relatively movable with respect to each shifter rod, locking members for each complementary set of shifter heads and rods, there being a longitudinal bore in each of said locking members through which the shafts extend, means formed on each of said locking members and engageable with the respective rods for locking said rods, and means formed on each of said locking members and engageable with the respective shafts for raising said locking members to release said rod upon the actuation of said lever.

13. A transmission gear shift locking mechanism comprising a frame, a plurality of laterally spaced and longitudinally movable shifter rods mounted in said frame, longitudinally movable shifter heads having forwardly extending shaft portions positioned parallel to and substantially vertically above each of the respective rods, each of said shifter heads operatively related to and relatively movable with respect to each shifter rod, locking members for each complementary set of shifter heads and rods, there being a longitudinal bore in each of said locking members through which the shafts extend, means formed on each of said locking members and engageable with the respective rods for locking said rods, means formed on each of said locking members and engageable with the respective shafts for raising said locking members to release said rod upon the actuation of said lever, and means mounted on said frame and engageable with certain of said shifter heads for locking certain of said rods from accidental displacement.

14. A transmission gear shift locking mechanism comprising a frame, a plurality of laterally spaced and longitudinally movable shifter rods mounted in said frame, longitudinally movable shifter heads having forwardly extending shaft portions positioned parallel to and substantially vertically above each of the respective rods, each of said shifter heads operatively related to and relatively movable with respect to each shifter rod, locking members for each complementary set of shifter heads and rods, there being a longitudinal bore in each of said locking members through which the shafts extend, means formed on each of said locking members and engageable with the respective rods for locking said rods, means formed on each of said locking members and engageable with the respective shafts for raising said locking members to release said rod upon the actuation of said lever, and a spring actuated frame mounted on said first named frame having inwardly projecting fingers located in the path of and engageable with said lever for centering said lever and locking certain of said shifter rods against accidental displacement.

15. A transmission gear shift locking mechanism comprising a frame, a plurality of longitudinally shiftable gear shift rods mounted on said frame, said rods having abrupted locking recesses therein, locking members carried by said frame having locking portions complementary to and engageable with the recesses in the respective rods, a gear shift lever, and separate shifter heads extending through said locking members and adapted to be selectively engaged by said lever, each of said shifter heads operatively related to its respective locking member and shifter rod for actuating the same.

MILFORD D. STEWART.
CHARLES F. ADAMS.

REFERENCES CITED

The following references are of record in the file of this patent:

UNITED STATES PATENTS

| Number | Name | Date |
| --- | --- | --- |
| 1,719,032 | Valletta | July 2, 1929 |
| 1,831,195 | Radford | Nov. 10, 1931 |
| 1,897,851 | Leach | Feb. 14, 1933 |
| 2,207,386 | Tampier | July 9, 1940 |
| 2,223,649 | Wagner | Dec. 3, 1940 |
| 2,266,397 | Noselins | Dec. 16, 1941 |